US009677497B2

(12) United States Patent
Kuzuyama et al.

(10) Patent No.: US 9,677,497 B2
(45) Date of Patent: Jun. 13, 2017

(54) FUEL INJECTION CONTROL APPARATUS AND COMPRESSION IGNITION TYPE INTERNAL COMBUSTION ENGINE

(71) Applicant: KABUSHIKI KAISHA TOYOTA JIDOSHOKKI, Kariya-shi, Aichi (JP)

(72) Inventors: Hiroshi Kuzuyama, Kariya (JP); Tsutomu Umehara, Kariya (JP); Takayuki Fuyuto, Nagakute (JP); Masahiro Taki, Nagakute (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 402 days.

(21) Appl. No.: 14/500,195

(22) Filed: Sep. 29, 2014

(65) Prior Publication Data

US 2015/0090217 A1    Apr. 2, 2015

(30) Foreign Application Priority Data

Sep. 30, 2013    (JP) ................. 2013-204542

(51) Int. Cl.
*F02D 41/40* (2006.01)
*F02D 41/14* (2006.01)
(Continued)

(52) U.S. Cl.
CPC ......... *F02D 41/403* (2013.01); *F02D 35/023* (2013.01); *F02D 41/1497* (2013.01);
(Continued)

(58) Field of Classification Search
CPC .............. F02D 41/1497; F02D 35/023; F02D 2041/288; F02D 2041/389;
(Continued)

(56) References Cited

U.S. PATENT DOCUMENTS 3,575,146 A * 4/1971 Creighton .............. F02M 45/04
123/299
4,083,234 A * 4/1978 Aono .................. F02D 41/1444
60/277

(Continued)

FOREIGN PATENT DOCUMENTS

DE    102009038439 A1    4/2010
EP        1707785 A2    10/2006
(Continued)

OTHER PUBLICATIONS

Communication dated Aug. 21, 2015 from the European Patent Office in counterpart application No. 14186882.8.

*Primary Examiner* — Sizo Vilakazi
*Assistant Examiner* — Brian Kirby
(74) *Attorney, Agent, or Firm* — Sughrue Mion, PLLC

(57) ABSTRACT

A fuel injection control apparatus of a compression ignition type internal combustion engine includes a controller adapted to control an injector so that pre-stage injection and post-stage injection are performed as fuel injection during one cycle. The controller controls an interval between the timing of the pre-stage injection and the timing of the post-stage injection so that an interval $\Delta t1$ between the timing of the pre-stage peak and the timing of the post-stage peak approximately satisfies a condition. The condition is that the interval $\Delta t1$ is 0.5 times an inverse number of the frequency $f0$ at which a combustion noise level becomes the maximum.

10 Claims, 17 Drawing Sheets

(51) Int. Cl.
*F02D 35/02* (2006.01)
*F02D 41/38* (2006.01)
*F02D 41/28* (2006.01)

(52) U.S. Cl.
CPC ......... *F02D 41/401* (2013.01); *F02D 41/402* (2013.01); *F02D 41/405* (2013.01); *F02D 2041/288* (2013.01); *F02D 2041/389* (2013.01); *Y02T 10/44* (2013.01)

(58) Field of Classification Search
CPC ......... F02D 41/404–41/405; F02D 2200/025; Y02T 10/44
USPC ........ 123/299, 406.41, 406.43; 701/103–105
See application file for complete search history.

(56) References Cited

U.S. PATENT DOCUMENTS

| | | | |
|---|---|---|---|
| 4,520,774 A * | 6/1985 | Sitter | F02M 45/04 123/300 |
| 4,704,999 A * | 11/1987 | Hashikawa | F02D 35/023 123/299 |
| 4,711,209 A * | 12/1987 | Henkel | F02M 55/02 123/300 |
| 5,042,718 A * | 8/1991 | Bergmann | F02M 45/04 239/124 |
| 5,119,780 A * | 6/1992 | Ariga | F02B 17/00 123/300 |
| 5,209,208 A * | 5/1993 | Siebert | F02M 45/066 123/299 |
| 6,378,487 B1 * | 4/2002 | Zukouski | F02B 3/10 123/295 |
| 6,688,279 B2 * | 2/2004 | Ishikawa | F02D 41/0057 123/299 |
| 6,840,211 B2 * | 1/2005 | Takahashi | F02D 41/403 123/299 |
| 7,284,531 B2 * | 10/2007 | Brachert | F02B 11/02 123/295 |
| 7,296,555 B2 * | 11/2007 | Tamma | F02D 41/403 123/299 |
| 7,305,964 B2 * | 12/2007 | Scherrieble | F02B 1/12 123/299 |
| 7,497,199 B2 * | 3/2009 | Canale | F02D 35/023 123/299 |
| 9,376,980 B2 | 6/2016 | Kuzuyama et al. | |
| 2002/0078918 A1 * | 6/2002 | Ancimer | F02B 1/12 123/295 |
| 2009/0112449 A1 * | 4/2009 | Binder | F02D 35/02 701/111 |
| 2011/0276255 A1 * | 11/2011 | Haskara | F02D 35/023 701/105 |
| 2013/0073186 A1 * | 3/2013 | Morinaga | F02D 13/0207 701/104 |
| 2013/0340720 A1 | 12/2013 | Kuzuyama et al. | |

FOREIGN PATENT DOCUMENTS

| | | | |
|---|---|---|---|
| EP | 2685075 A1 | 1/2014 | |
| FR | 2918117 A1 * | 1/2009 | ............ F02D 35/02 |
| JP | 63-009657 A | 1/1988 | |
| JP | EP 1128050 A2 * | 8/2001 | ........... F02D 35/023 |
| JP | 2002-047975 A | 2/2002 | |
| JP | 2006-46217 A | 2/2006 | |
| JP | 3803903 B2 | 8/2006 | |
| JP | 2012189035 A | 10/2012 | |
| WO | 0220956 A1 | 3/2002 | |
| WO | 2011142112 A1 | 11/2011 | |

* cited by examiner

FUEL INJECTION CONTROL APPARATUS AND COMPRESSION IGNITION TYPE INTERNAL COMBUSTION ENGINE

BACKGROUND

The present invention relates to a fuel injection control apparatus of a compression ignition type internal combustion engine. Particularly, the present invention relates to a technology which decreases combustion noise of a compression ignition type internal combustion engine.

RELATED BACKGROUND ART

As a method which decreases combustion noise of a compression ignition type internal combustion engine such as a diesel engine, there is a so-called pilot injection. The pilot injection is a method in which a small quantity of fuel is injected before a main injection. According to the pilot injection, it is possible to shorten ignition delay of the main injection. Japanese Unexamined Patent Application Publication No. 63-9657 discloses a technology related to the pilot injection. In this technology, overall combustion noise is decreased by examining pilot injection timing.

Japanese Patent No. 3803903 discloses a technology which decreases a noise level of an internal combustion engine. This technology is not directed to decrease the above-described overall combustion noise. This technology is directed to decrease the noise level intensively in a frequency range having a high noise level. In this technology, a two-stage combustion which includes fuel combustion by the pilot injection and fuel combustion by the main combustion is performed. In a control of the two-stage combustion, a combustion interval $\Delta t$ is controlled so that the following expression (1) is satisfied (n is an integer of 0 or more). Here, the combustion interval $\Delta t$ is a time difference between a time during which pressure waves are generated at the time of the fuel combustion by the pilot injection and a time during which pressure waves are generated at the time of the fuel combustion by the main injection. According to the generation time difference, the pressure waves at the time of the fuel combustion by the pilot injection and the pressure waves at the time of the fuel combustion by the main injection are offset from each other at a specific frequency fn. Therefore, according to the control in which the expression (1) is satisfied, it is possible to decrease a combustion noise component of the specific frequency fn.

$$fn=(n+0.5)/\Delta t \quad (1)$$

SUMMARY

The inventors performed experiments for examining reduction effects of combustion noise by two-stage combustion. In this experiment, the combustion interval $\Delta t$ was set to approximately 6° by a crank angle. The value of the crank angle is approximately 0.5 msec which is converted into a time when an engine rotation speed is 2000 rpm. As a result, a combustion noise spectrum illustrated in FIG. 12 was obtained. As illustrated in the noise spectrum of FIG. 12, compared to the case of one-stage combustion, the combustion noise component in the vicinity of 3 kHz was decreased. However, the combustion noise component in the vicinity of approximately 1.5 kHz to 2 kHz was increased. Moreover, as illustrated in FIG. 13, overall combustion noise was deteriorated. The reason is because the following expression (2) is satisfied (n is an integer of 0 or more) in the specific frequency gn of approximately 1.5 kHz to 2 kHz, and pressure waves at the time of combustion are not offset and, conversely, are amplified to be strengthened. When the expression (1) is satisfied in the technology disclosed in Japanese Patent No. 3803903, since the pressure waves at the time of the combustion at the specific frequency fn are offset, the combustion noise component in the vicinity of the specific frequency fn is decreased. However, Japanese Patent No. 3803903 does not disclose that when the expression (2) is satisfied, the combustion noise component is increased in the vicinity of the specific frequency gn since the pressure waves at the time of the combustion at the specific frequency gn are strengthened. As a result, in the technology disclosed in Japanese Patent No. 3803903, the overall combustion noise may be increased according to the control of the combustion interval $\Delta t$.

$$gn=(n+1)/\Delta t \quad (2)$$

Moreover, in the technology disclosed in Japanese Patent No. 3803903, the time difference between the time during which the pressure waves are generated at the time of the fuel combustion by the pilot injection and the time during which the pressure waves are generated at the time of the fuel combustion by the main injection is the combustion interval $\Delta t$. At this time, while each fuel combustion is performed, the timing in which the pressure waves are generated is rising timing of a waveform which is obtained by differentiating a cylinder pressure by a time. However, the inventors performed the experiments by examining the reduction effects of the combustion noise by two-stage combustion, and as illustrated by waveforms of FIG. 14, found that the rising timing of the waveform obtained by the second stage combustion might not be clearly represented. Accordingly, when the time difference between the rising timing of the waveform which is obtained by differentiating the cylinder pressure by a time at the time of the fuel combustion by the pilot injection, and the rising timing of the waveform which is obtained by differentiating the cylinder pressure by a time at the time of the fuel combustion by the main injection is set to the combustion interval $\Delta t$, there is a concern that errors in the setting of the combustion interval $\Delta t$ may occur. As a result, the reduction effects in the combustion noise in the specific frequency fn may be improved.

An object of the present invention is to provide a fuel injection control apparatus capable of improving reduction effects of overall combustion noise by improving reduction effects of the combustion noise in a frequency range having a high combustion noise level.

According to an aspect of the present invention, there is provided a fuel injection control apparatus of a compression ignition type internal combustion engine, wherein fuel is injected into a cylinder and combusted by self-ignition, the apparatus comprising: a controller configured to control an injector that injects the fuel into the cylinder so as to perform pre-stage injection and post-stage injection as fuel injection during one cycle, wherein the controller: adjusts timing of the pre-stage injection, an injection amount of the pre-stage injection, timing of the post-stage injection, and an injection amount of the post-stage injection so that a value obtained by differentiating a cylinder pressure by a time or a value obtained by differentiating the cylinder pressure by a crank angle during one cycle has a pre-stage peak by combustion of the fuel supplied by the pre-stage injection and a post-stage peak by combustion of the fuel supplied by the post-stage injection; and adjusts an interval $\Delta t0$ between the timing of the pre-stage injection and the timing of the post-stage injection so that an interval $\Delta t1$ between the timing of the pre-stage peak and the timing of the post-stage peak approximately satisfies a condition such that $\Delta t1=0.5/f0$, wherein f0 is a frequency at which a combustion noise level becomes the maximum when fuel injection is performed so that a single peak equal to or more than a set value is derived from the value obtained by differentiating the cylinder pressure by a time or the value obtained by differentiating the cylinder pressure by a crank angle during one cycle.

In the aspect of the present invention, the controller may control the interval $\Delta t0$ between the timing of the pre-stage injection and the timing of the post-stage injection based on an engine rotation speed and an engine load so that the interval $\Delta t1$ between the timing of the pre-stage peak and the timing of the post-stage peak approximately satisfies the condition.

In the aspect of the present invention, the controller may control the interval $\Delta t0$ between the timing of the pre-stage injection and the timing of the post-stage injection based on a characteristic map indicating a relationship of the interval $\Delta t0$ between the timing of the pre-stage injection and the timing of the post-stage injection with respect to an engine rotation speed and an engine load.

In the aspect of the present invention, the controller may control the interval $\Delta t0$ between the timing of the pre-stage injection and the timing of the post-stage injection so that the interval $\Delta t1$ between the timing of the pre-stage peak and the timing of the post-stage peak approximately satisfies the condition, based on the value obtained by differentiating the cylinder pressure by a time or the value obtained by differentiating the cylinder pressure by a crank angle during one cycle, the cylinder pressure being detected by a cylinder pressure sensor.

In the aspect of the present invention, the controller may control the interval $\Delta t0$ between the timing of the pre-stage injection and the timing of the post-stage injection based on a table indicating the relationship of the interval $\Delta t0$ between the timing of the pre-stage injection and the timing of the post-stage injection with respect to the interval $\Delta t1$ between the timing of the pre-stage peak and the timing of the post-stage peak.

In the aspect of the present invention, the controller may control the timing of the pre-stage injection so that Premixed Charge Compression Ignition Combustion is performed on fuel supplied by the pre-stage injection.

In the aspect of the present invention, the controller may control adjust the interval $\Delta t0$ between the timing of the pre-stage injection and the timing of the post-stage injection so that the interval $\Delta t1$ becomes $0.5/(f0+0.1 \times f0/1.1)$ or more and $0.5/(f0-0.1 \times f0/1.1)$ or less.

In the aspect of the present invention, the controller may adjust the timing of the post-stage injection and the injection amount of the post-stage injection so that a post-stage peak value in the value obtained by differentiating the cylinder pressure by a time or a post-stage peak value in the value obtained by differentiating the cylinder pressure by a crank angle becomes a positive value.

In the aspect of the present invention, the controller may adjust the timing of the post-stage injection and the injection amount of the post-stage injection so that a difference between a smaller value of the pre-stage peak value or the post-stage peak value and the minimum value of the valley is 50 kPa/deg. or more.

DETAILED DESCRIPTION

Embodiments of the present invention will be described with reference to the drawings.

Figure 1:
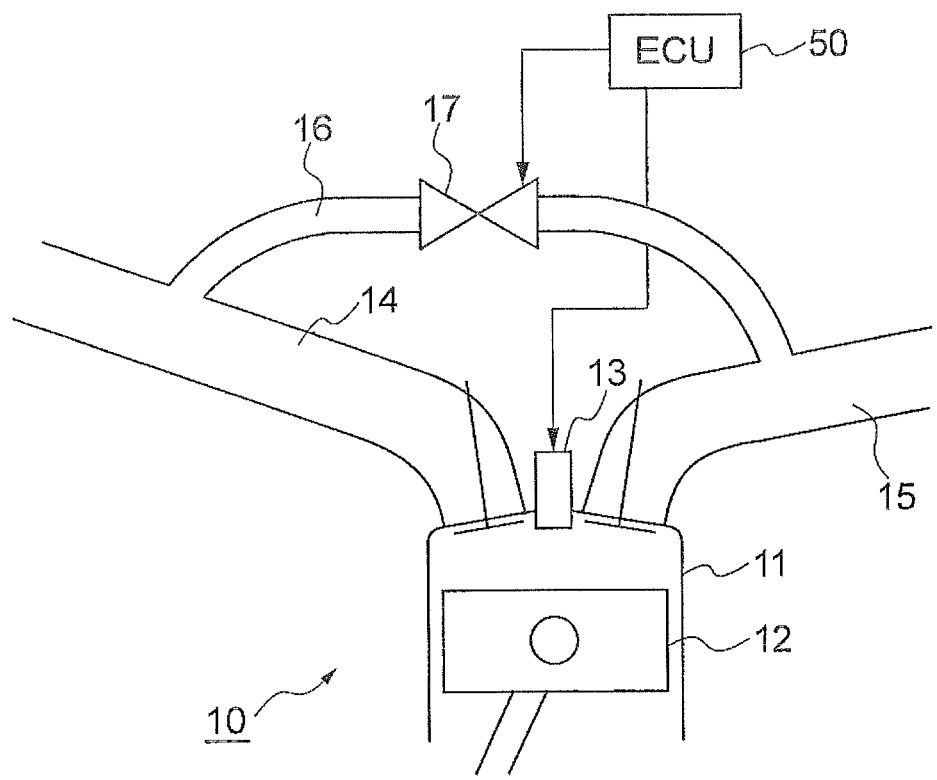
FIG. 1 is a view illustrating a schematic configuration of a compression ignition type internal combustion engine according to an aspect of the present invention.

FIG. 1 is a view illustrating a configuration example of a compression ignition type internal combustion engine 10 according to an embodiment of the present invention. The compression ignition type internal combustion engine 10 includes a fuel injection apparatus. The fuel injection apparatus includes an injector 13 and an electronic control device 50. In FIG. 1, a configuration having only one cylinder is illustrated. However, the similar configuration is applied to a case having multiple cylinders. For example, the compression ignition type internal combustion engine 10 is a diesel engine which uses a piston-crank mechanism. In the compression ignition type internal combustion engine 10, air is sucked from an intake port 14 into a cylinder 11 in an intake stroke. The air sucked into the cylinder 11 is compressed by a piston 12 in a compression stroke. The intake air to be sucked in the cylinder 11 may be compressed by a supercharger such as a turbocharger (not illustrated). When fuel (for example, a liquid fuel such as a diesel fuel) is directly injected into the cylinder 11 from the injector 13, the fuel in the cylinder 11 is self-ignited and combusted. Injection timing (injection start timing) and an injection period (injection quantity) of the fuel from the injector 13 are controlled by the electronic control device 50. In an exhaust stroke, the exhaust gas after the combustion is discharged to an exhaust port 15. The compression ignition type internal combustion engine 10 includes a recirculation pathway 16 which connects the exhaust port 15 and the intake port 14. The recirculation pathway 16 supplies a portion of the exhaust gas after the combustion to the intake port 14 (an intake air side) as an exhaust recirculation gas. As such, an Exhaust Gas Recirculation (EGR) is performed. The recirculation pathway 16 includes an EGR control valve 17. An opening degree of the EGR control valve 17 is controlled by the electronic control device 50. According to the control of the opening degree, a recirculation quantity of the exhaust gas (EGR gas) from the exhaust port 15 to the intake port 14 is controlled. Accordingly, a quantity of an EGR gas (EGR ratio), which is supplied to the intake air side and sucked into the cylinder, is controlled. Here, it is not necessary to perform EGR and the recirculation pathway 16 as well as the EGR control valve 17 may be omitted.

Figure 2:
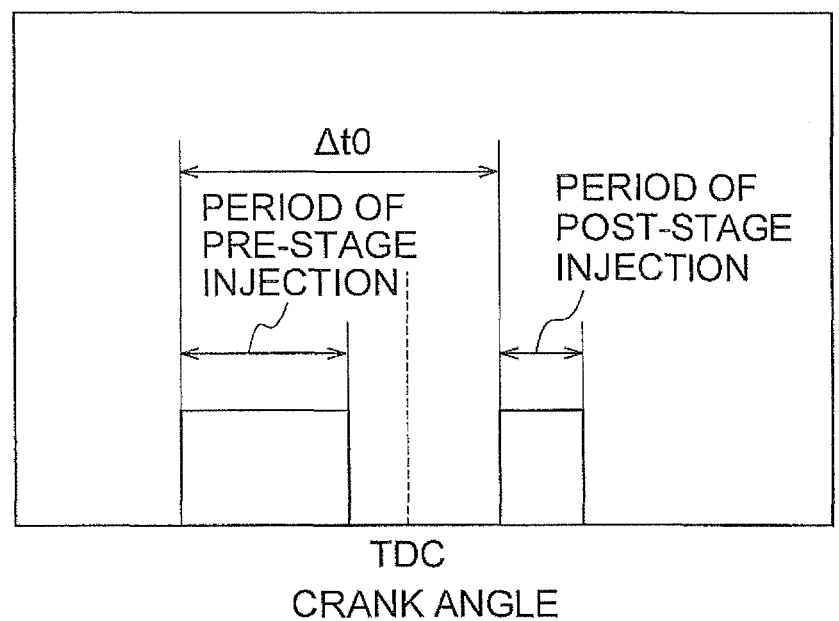
FIG. 2 is a view illustrating an example of a fuel injection pattern.
Figure 3:
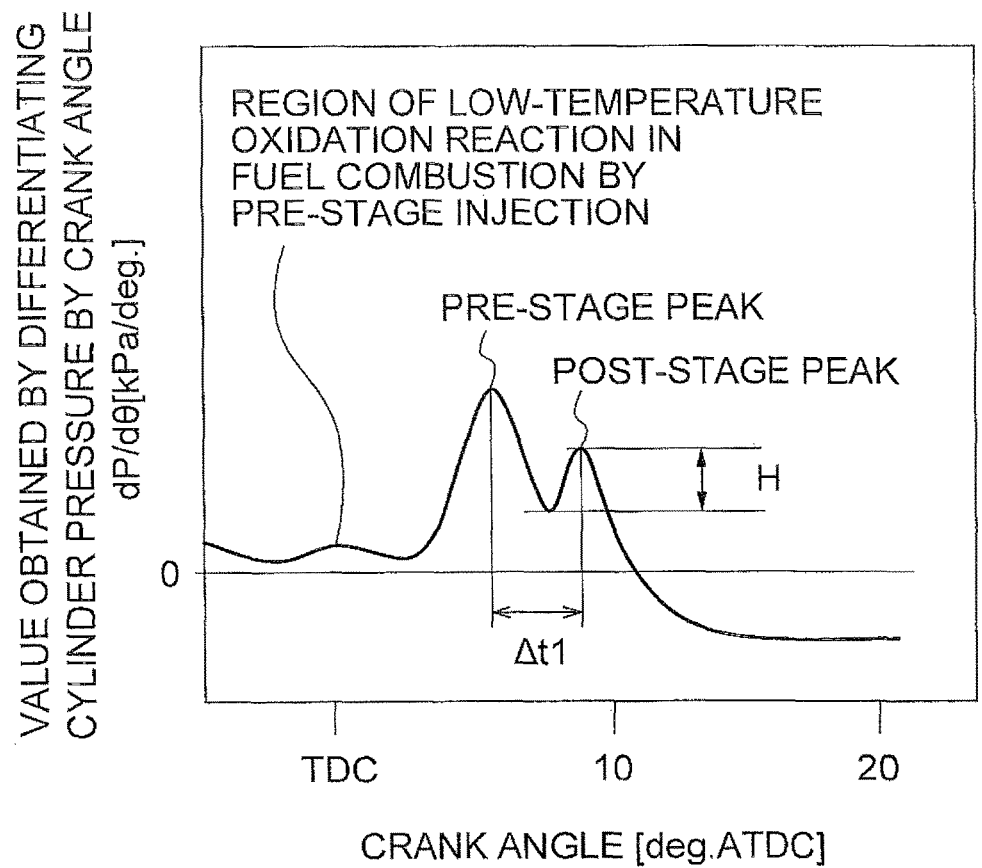
FIG. 3 is a view illustrating an example of a value which is obtained by differentiating a cylinder pressure by a crank angle.

In the present embodiment, the electronic control device 50 controls the injector 13 so that fuel injection during one cycle with respect to each cylinder is divided into a two-stage injection including pre-stage injection and post-stage injection. FIG. 2 illustrates an example of a fuel injection pattern by the pre-stage injection and the post-stage injection. For example, the electronic control device 50 controls the injection start timing and the injection quantity so that the pre-stage injection ends before the compression top dead center. After the pre-stage injection ends, Premixed Charge Compression Ignition combustion (PCCI combustion) are preformed on the pre-mixed gas of the pre-stage injection fuel and the intake air, which are formed in the cylinder 11, by self ignition. The PCCI combustion includes low-temperature oxidation reaction and high-temperature oxidation reaction after the low-temperature oxidation reaction. For example, as illustrated in FIG. 3, the value (heat generation rate) obtained by differentiating the cylinder pressure during one cycle by a crank angle includes the maximum value (hereinafter, referred to as a "pre-stage peak value") due to the fuel combustion (high-temperature oxidation reaction) by the pre-stage injection after the compression top dead center. In addition, for example, the electronic control device 50 controls the injection start timing so that the post-stage injection starts after the compression top dead center. Moreover, for example, as illustrated in FIG. 3, the electronic control device 50 controls the injection start timing and the injection quantity of the post-stage injection so that the maximum value (hereinafter, referred to as a "post-stage peak value") due to the fuel combustion by the post-stage injection is generated after the timing of the pre-stage peak from the value which is obtained by differentiating the cylinder pressure during one cycle by the crank angle. In the example of FIG. 3, a vertical axis indicates the value which is obtained by differentiating the cylinder pressure by the crank angle. However, a value which is obtained by differentiating the cylinder pressure by a time may be indicated on the vertical axis. Moreover, in the example of FIG. 2, the injection period of the post-stage injection is shorter than the injection period of the pre-stage injection. In addition, in the example of FIG. 2, the injection quantity of the post-stage injection is smaller than the injection quantity of the pre-stage injection. However, the injection period (injection quantity) of the post-stage injection is equal to or more than the injection period (injection quantity) of the pre-stage injection.

In the present embodiment, the electronic control device 50 controls an interval Δt0 between the pre-stage injection timing and the post-stage injection timing so that a condition in which the pressure waves are offset is approximately satisfied. Here, the condition in which the pressure waves are offset means a condition in which an interval Δt1 between the timing of the pre-stage peak and the timing of the post-stage peak becomes 0.5 times an inverse number of the frequency f0 at which the combustion noise level becomes the maximum when the fuel injection is performed so that a single peak equal to or more than a set value is derived from the value obtained by differentiating the cylinder pressure by the crank angle (or the value which is obtained by differentiating the cylinder pressure by a time) during one cycle. The set value is set to a value which is larger than the peak by the low-temperature oxidation reaction and is smaller than the peak by the high-temperature oxidation reaction. For example, the frequency ID at which the combustion noise level is the maximum is obtained based on a combustion noise spectrum. The combustion noise spectrum is obtained by performing Fast Fourier Transform (FFT) on cylinder pressure history obtained from a detection value of a cylinder pressure sensor by an actual machine experiment or the like. For example, the timing of the pre-stage peak and the timing of the post-stage peak is obtained from the value which is obtained by differentiating the cylinder pressure history by the crank angle (or the value which is obtained by differentiating the cylinder pressure history by a time). For example, the cylinder pressure history is the detection value of the cylinder pressure sensor by the actual machine experiment or the like. The combustion noise of the compression ignition type internal combustion engine 10 is generated by the pressure waves generated at the time of the combustion. In the compression ignition type internal combustion engine 10, the pressure waves generated at the time of the fuel combustion by the pre-stage injection and the pressure waves generated at the time of the fuel combustion by the post-stage injection interfere with each other and are offset from each other, and thus, the combustion noise is decreased.

Figure 4:
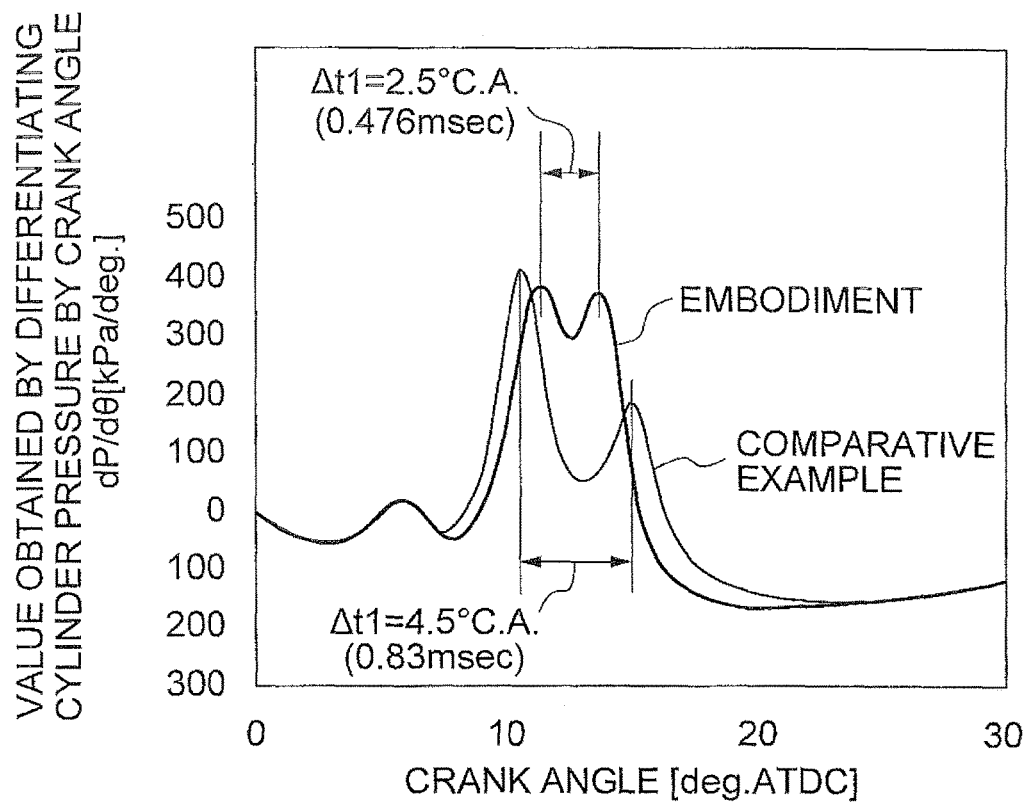
FIG. 4 is a view illustrating an example of a value which is obtained by differentiating the cylinder pressure by the crank angle in an actual machine experiment.
Figure 5A:
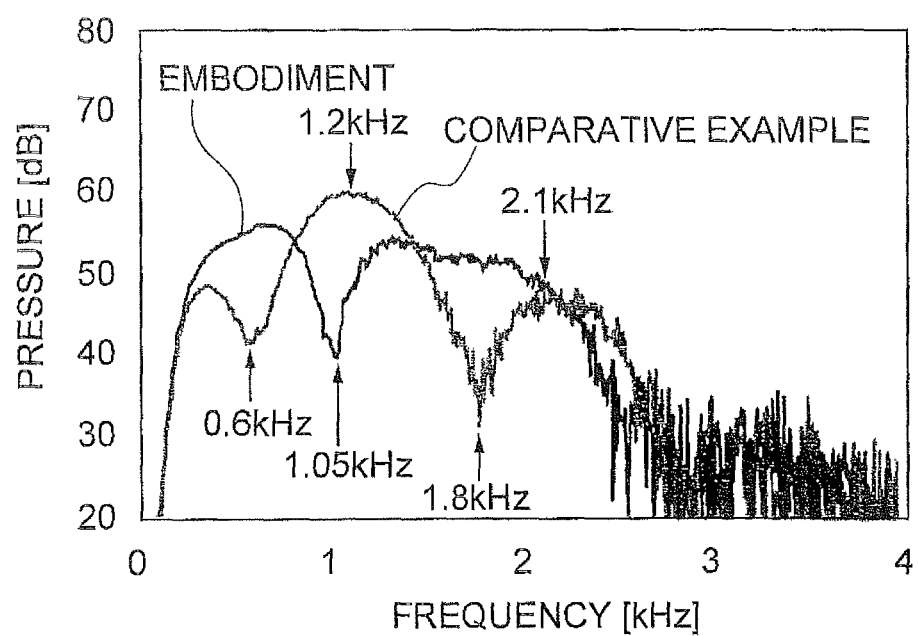
FIG. 5A is a view illustrating an example of a combustion noise spectrum in the actual machine experiment.
Figure 5B:
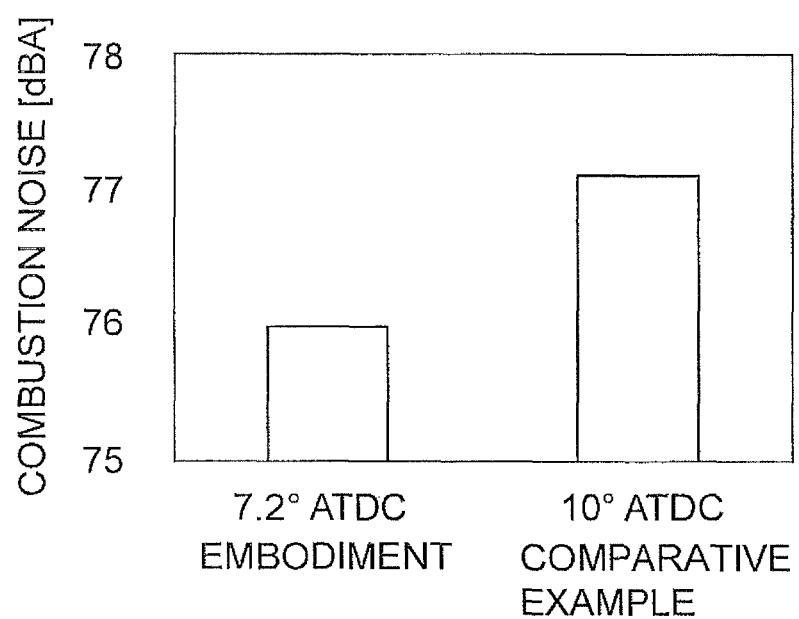
FIG. 5B is a view illustrating an example of the overall combustion noise level in the actual machine experiment.

The inventors performed the experiment examining reduction effects of the combustion noise using an actual machine. In this experiment, the PCCI combustion (one-stage combustion) by one-stage injection was performed so that the peak equal to or more than the set value from the value obtained by differentiating the cylinder pressure during one cycle by the crank angle (or the value obtained by differentiating the cylinder pressure by a time) was one. As a result, the frequency at which the combustion noise level was the maximum was approximately 1.05 kHz (period: approximately 0.952 msec). Accordingly, in the present experiment, the interval Δt1 between the timing of the pre-stage peak by the fuel combustion (high-temperature oxidation reaction) by the pre-stage injection and the timing of the post-stage peak by the fuel combustion by the post-stage injection was approximately 2.5° by the crank angle. If the value of the crank angle is converted into a period, the converted value is approximately 0.476 msec (0.5/f0=0.5/1.05 msec). In addition, the interval Δt0 between the start timing of the pre-stage injection and the start timing of the post-stage injection was adjusted so that the interval Δt1 was satisfied (refer to the embodiment of FIG. 4). As a result, the start timing of the post-stage injection was 7.2° after the compression top dead center so that the interval Δt1 was satisfied. Accordingly, as illustrated in the embodiment of FIG. 5A, the pressure waves generated at the time of the fuel combustion by the pre-stage injection and the pressure waves generated at the time of the fuel combustion by the post-stage injection were offset from each other in the vicinity of 1.05 kHz. Accordingly, the combustion noise component was decreased in a frequency band in the vicinity of the 1.05 kHz. On the other hand, in the frequency band in the vicinity of 2.1 kHz, the pressure waves generated at the time of the fuel combustion by the pre-stage injection and the pressure waves generated at the time of the fuel combustion by the post-stage injection were strengthened. As a result, in the frequency band in the vicinity of the 2.1 kHz, the combustion noise component was increased. Here, in the combustion noise spectrum, the combustion noise component in the vicinity of 2.1 kHz is smaller than the combustion noise component in the vicinity of 1 kHz. Accordingly, the combustion noise component in the vicinity of 2.1 kHz barely influences the overall combustion noise level. As a result, as illustrated in FIG. 5B, the overall combustion noise level was decreased to 76 dBA.

As described above, according to the compression ignition type internal combustion engine 10 in the embodiment of the present invention, in the vicinity of the frequency at which the combustion noise level is the maximum, the pressure waves generated at the time of the fuel combustion by the pre-stage injection and the pressure waves generated at the time of the fuel combustion by the post-stage injection are offset from each other, and thus, the reduction effects in the combustion noise component are improved. As a result, in the compression ignition type internal combustion engine 10, it is possible to improve the reduction effects in the overall combustion noise.

The inventors performed the experiment according to a comparative example. In the experiment according to the comparative example, the interval Δt0 between the start timing of the pre-stage injection and the start timing of the post-stage injection was set to be longer than the above-described experiment example. Specifically, the start timing of the post-stage injection was set to 10° after the compression top dead center. According to this condition, as illustrated by graph C1 of FIG. 4, the interval Δt1 between the timing of the pre-stage peak in the fuel combustion (high-temperature oxidation reaction) by the pre-stage injection and the timing of the post-stage peak in the fuel combustion by the post-stage injection is approximately 4.5° by the crank angle. If the crank angle is converted into a period, the converted value is approximately 0.83 msec. As a result, as illustrated in graph C2 of FIG. 5A, since the pressure waves generated at the time of the combustion are offset in the vicinity of 0.6 kHz (period: approximately 1.66 msec) and in the vicinity of 1.8 kHz (period: approximately 0.55 msec), the combustion noise component is decreased. However, since the pressure waves generated at the time of the combustion are strengthened in the vicinity of approximately 1.2 kHz (period: approximately 0.83 msec), the combustion noise component is increased. This period approximately coincides with the interval Δt1 between the timing of the pre-stage peak and the timing of the post-stage peak. Here, in the combustion noise spectrum, the combustion noise component in the vicinity of 1.2 kHz is larger than the combustion noise components in the vicinity of 0.6 kHz and in the vicinity of 1.8 kHz. Moreover, the overall combustion noise level is determined as the maximum value of the combustion noise components included in the combustion noise spectrum. Accordingly, as illustrated in FIG. 5B, in the condition in which the start timing of the post-stage injection is delayed, the overall combustion noise level is increased to 77.2 dB.

Figure 6:
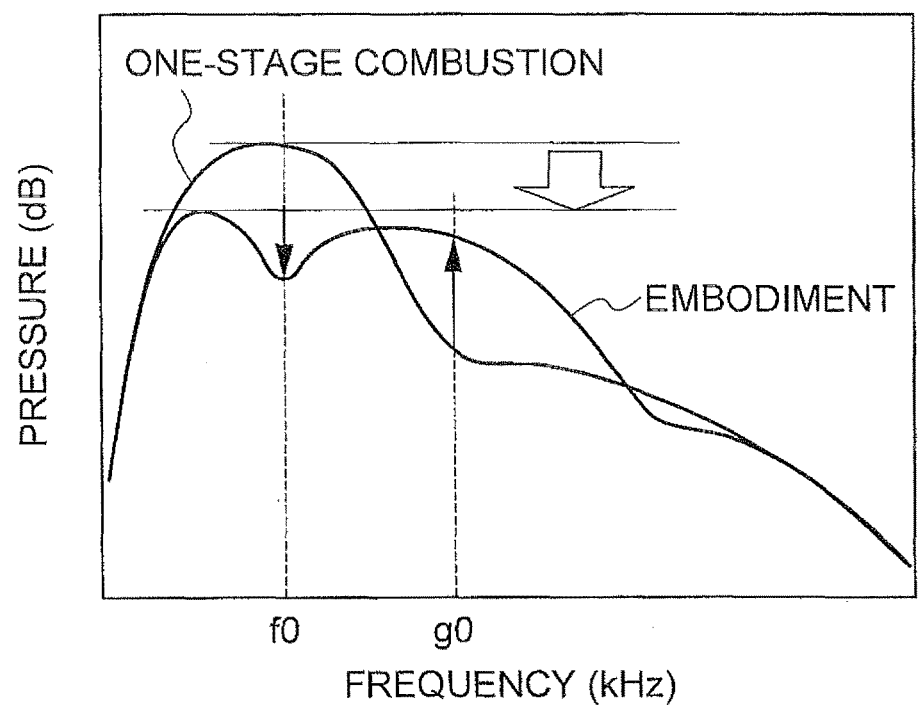
FIG. 6 is a view illustrating an example of a change of the combustion noise spectrum.
Figure 14:
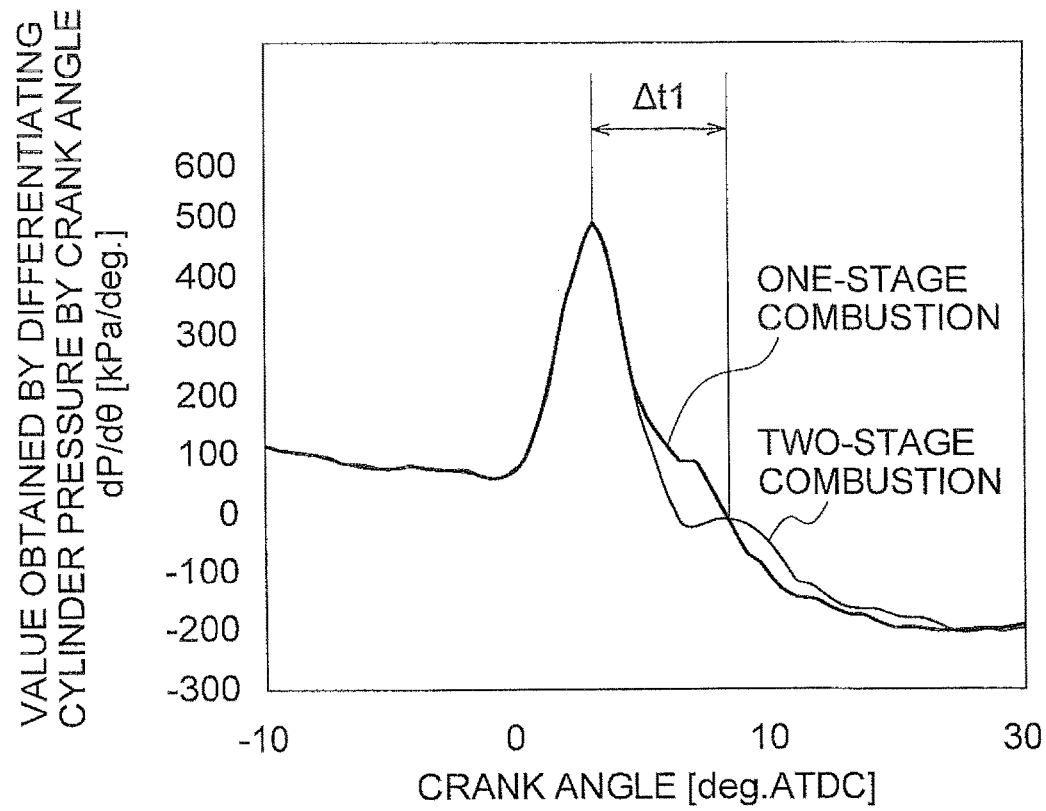
FIG. 14 is a view illustrating another example of the value which is obtained by differentiating the cylinder pressure by a crank angle in the actual machine experiment.

The compression ignition type internal combustion engine 10 of the present embodiment controls the interval Δt0 between the start timing of the pre-stage injection and the starting timing of the post-stage injection so that the interval Δt1 between the timing of the pre-stage peak and the timing of the post-stage peak approximately satisfies the offset condition in which the pressure waves are offset, which are 0.5 times the inverse number of the frequency f0 at which the noise level of the PCCI combustion becomes the maximum. According to this control, for example, as illustrated in the combustion noise spectrum of FIG. 6, the pressure waves generated at fuel combustion by the pre-stage injection and the pressure waves generated at fuel combustion by the post-stage injection are offset from each other in the vicinity of the frequency f0. Accordingly, it is possible to decrease the combustion noise component. In addition, in this control, unlike Japanese Patent No. 3803903, the time difference of the rising time of the value obtained by differentiating the cylinder pressure by a time is not set to the control parameter, and the interval Δt1 of the peak timing from the value obtained by differentiating the cylinder pressure by a time (or the value obtained by differentiating the cylinder pressure by the crank angle) is set to the control parameter. For example, as illustrated in FIG. 14, from the value obtained by differentiating the cylinder pressure by the crank angle, the rising timing by the second stage combustion may not be clearly represented. On the other hand, the peak timing of the value obtained by differentiating the cylinder pressure by the crank angle is clearly represented. Therefore, according to this method, it is possible to improve the reduction effects of the combustion noise component in the vicinity of the frequency f0 by suppressing setting errors of the interval Δt1 of the peak timing. In addition, the overall combustion noise level is determined as the maximum of the combustion noise components included in the combustion noise spectrum. Accordingly, for example, as illustrated in FIG. 6, in a frequency band of a small combustion noise spectrum as the vicinity of in the frequency g0, even when the pressure waves generated at the time of the combustion are strengthened and the combustion noise component is increased, the overall combustion noise level is barely influenced. It is possible to improve the reduction effects of the overall combustion noise by improving the reduction effects of the combustion noise component in the vicinity of the frequency f0 at which the combustion noise spectrum is the maximum.

Moreover, the inventors performed an actual machine experiment, and as a result, it was found that the combustion noise spectrum when the PCCI combustion (one-stage combustion) was performed so that the peak equal to or more than the set value from the value obtained by differentiating the cylinder pressure during one cycle by the crank angle (or the value obtained by differentiating the cylinder pressure by a time) is one is a gentle curve in the frequency f0 at which the combustion noise level is the maximum as illustrated in one-stage combustion of FIG. 6. For example, when f0 is 1.1 kHz, the frequency band, within which the combustion noise spectrum is large (becomes the vicinity of the maximum), has a bandwidth of approximately 1.0 kHz to 1.2 kHz. In the compression ignition type internal combustion engine 10 of the present embodiment, even when the interval Δt1 is a value which is slightly deviated from 0.5/f0, it is possible to decrease the combustion noise component at the frequency band within which the combustion noise spectrum is large. For example, when the frequency band within which the combustion noise spectrum is large is 1.0 kHz to 1.2 kHz (f0=1.1 kHz), the interval Δt1 may be controlled to a range equal to or more than 0.417 (=0.5/1.2) msec and less than or equal to 0.5 msec. In this way, it is possible to decrease the combustion noise component at the frequency band within which the combustion noise spectrum is large also by controlling the interval Δt0 between the start timing of the pre-stage injection and the start timing of the post-stage injection so that the interval Δt1 is equal to or more than 0.5/(f0+0.1) msec and less than or equal to 0.5/(f0−0.1) msec. In addition, the interval Δt0 between the start timing of the pre-stage injection and the start timing of the post-stage injection may be controlled so that the interval Δt1 is equal to or more than 0.46/f0 (=0.5/(f0+0.1×f0/1.1)) and equal to or less than 0.55/f0 (=0.5/(f0−0.1×f0/1.1)).

In addition, the inventors performed an actual machine experiment by examining the reduction effects of the combustion noise. As a result, it was found that the injection quantity of the post-stage injection may be controlled so that the value of the post-stage peak from the value obtained by differentiating the cylinder pressure by the crank angle is a positive value. According to this control, it is possible to further improve the reduction effects of the combustion noise component at the frequency f0 by the offset of the pressure waves generated at the time of the combustion. Moreover, a clear valley (the minimum value) exists between the pre-stage peak value and the post-stage peak value, and the injection starting timing and the injection quantity of the post-stage injection may be controlled so that a difference H between a smaller value (the post-stage peak value in the example of FIG. 3) of the pre-stage peak value or the post-stage peak value and the minimum value of the valley is equal to or more than 50 kPa/deg.

Figure 7:
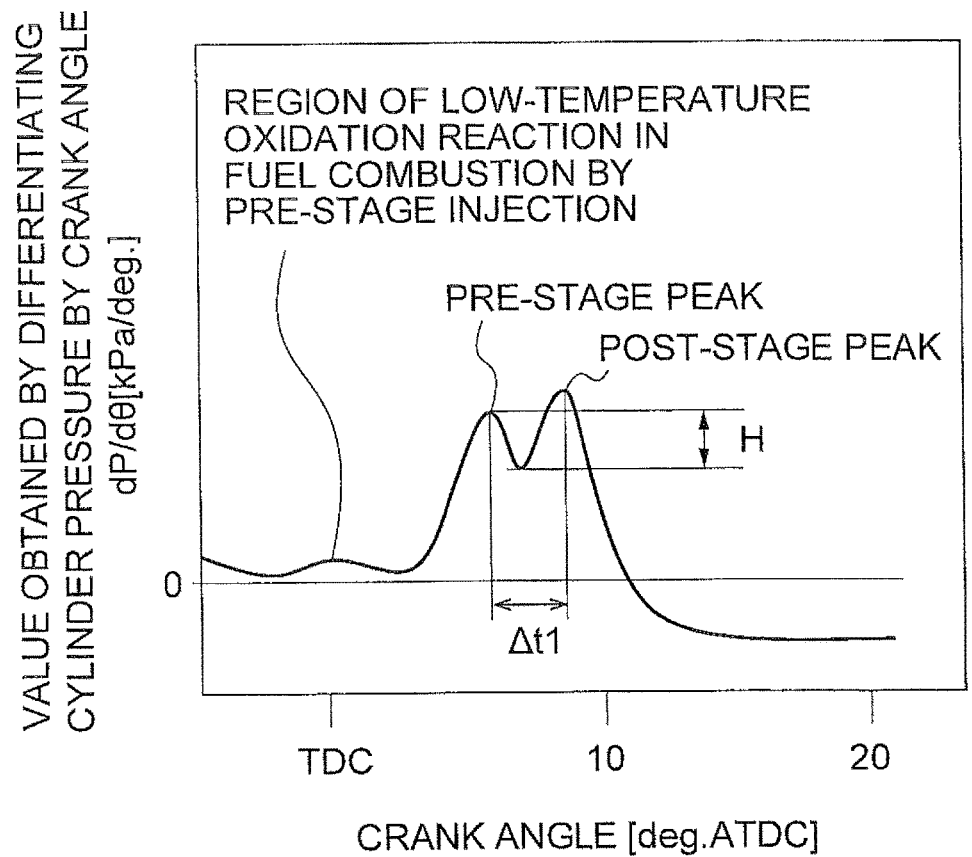
FIG. 7 is a view illustrating another example of a value which is obtained by differentiating the cylinder pressure by the crank angle.

In addition, when the injection quantity of the post-stage injection is equal to or more than the injection quantity of the pre-stage injection, for example, as illustrated in FIG. 7, the post-stage peak value from the value obtained by differentiating the cylinder pressure by the crank angle may be larger than the pre-stage peak value. However, even in this case, according to the compression ignition type internal combustion engine 10, the pressure waves generated at the time of the fuel combustion by the pre-stage injection and the pressure waves generated at the time of the fuel combustion by the post-stage injection are offset from each other, and it is possible to decrease the combustion noise component in the vicinity of the frequency f0. In the case, the injection start timing and the injection quantity of the post-stage injection may be controlled so that the difference H between the pre-stage peak value and the minimum of the valley is equal to or more than 50 kPa/deg. According to this control, it is possible to further improve the reduction effects of the combustion noise component by the offset of the pressure waves generated at the time of the combustion at the frequency f0.

Figure 8:
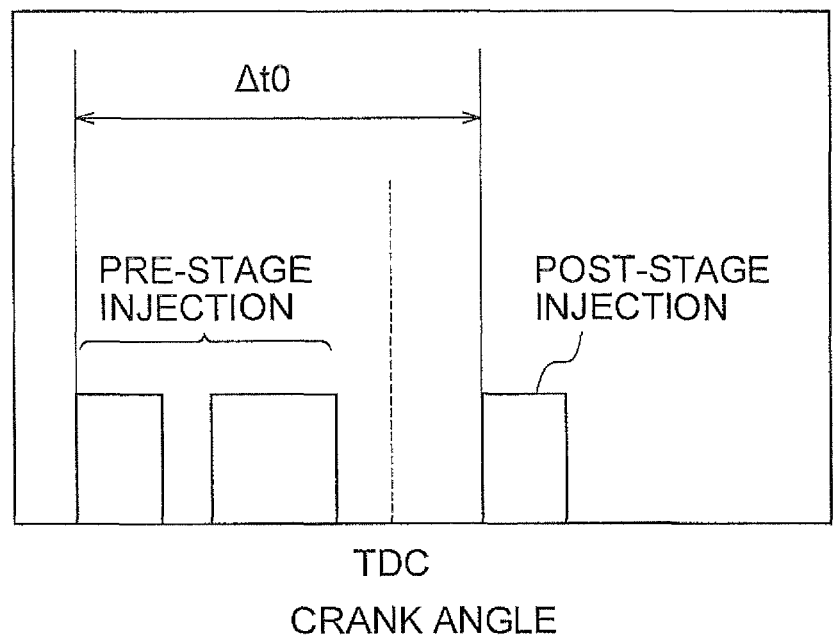
FIG. 8 is a view illustrating another example of the fuel injection pattern.

In the present embodiment, for example, as illustrated in a fuel injection pattern of FIG. 8, the pre-stage injection may be divided into a plurality of times. At this time, from the value obtained by differentiating the cylinder pressure during one cycle by the crank angle (or the value obtained by differentiating the cylinder pressure by a time), the injection start timing and the injection period of each pre-stage injection may be controlled so that the pre-stage peak in the fuel combustion (high-temperature oxidation reaction) by the pre-stage injection is one. In addition, the interval M0 between the start timing of the first pre-stage injection and the start timing of the post-stage injection is controlled so that the offset condition in which the pressure waves are offset is approximately satisfied. In addition, FIG. 8 illustrates the example in which the pre-stage injection is divided into two times. However, the pre-stage injection may be divided into three times or more.

Figure 9:
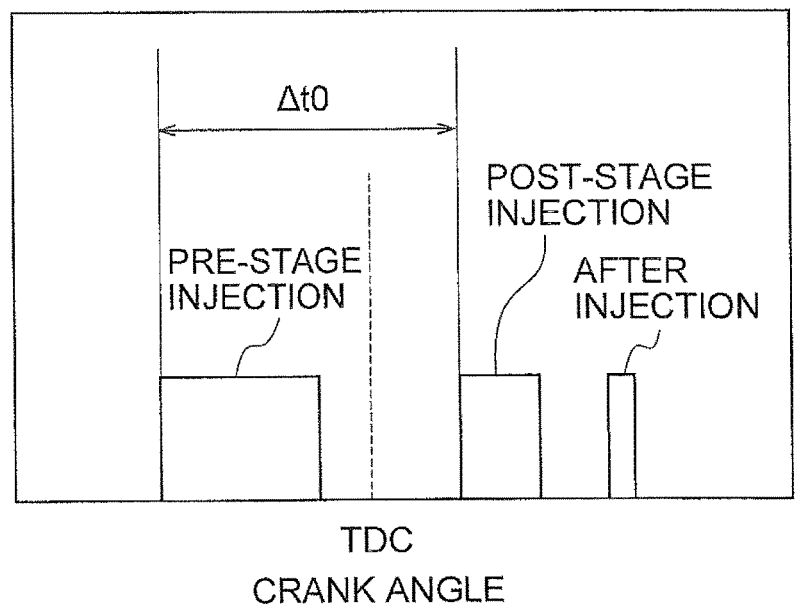
FIG. 9 is a view illustrating still another example of the fuel injection pattern.
Figure 10:
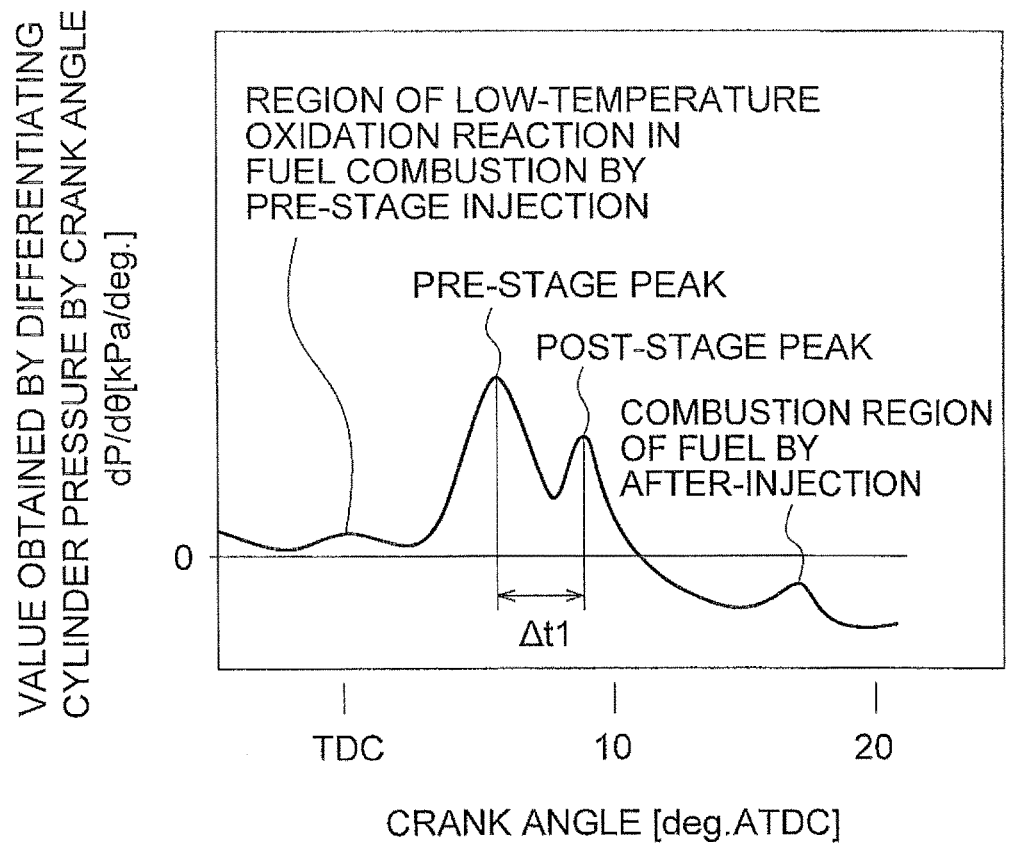
FIG. 10 is a view illustrating still another example of the value which is obtained by differentiating the cylinder pressure by the crank angle.

Moreover, in the present embodiment, for example, as illustrated in a fuel injection pattern of FIG. 9, a minute quantity of fuel injection (hereinafter, referred to as after-injection) after the post-stage injection may be performed. In this case, the value obtained by differentiating the cylinder pressure by the crank angle (or the value obtained by differentiating the cylinder pressure by a time) includes the peak by the combustion of the after-injection fuel. The after-injection fuel is injected when time passes after the compression top dead center. Accordingly, as illustrated in FIG. 10, from the value obtained by differentiating the cylinder pressure by the crank angle (or the value obtained by differentiating the cylinder pressure by a time), the peak in the fuel combustion by the after-injection is much smaller than the pre-stage peak by the fuel combustion of the pre-stage injection and the post-stage peak by the fuel combustion of the post-stage injection, and in most cases, have negative values. Accordingly, even when the after-injection is performed, interference between the pressure waves generated at the time of the fuel combustion by the after-injection and the pressure waves generated at the time of the fuel combustion by the pre-stage injection or the pressure waves generated at the time of the fuel combustion by the post-stage injection is barely generated.

Figure 11A:
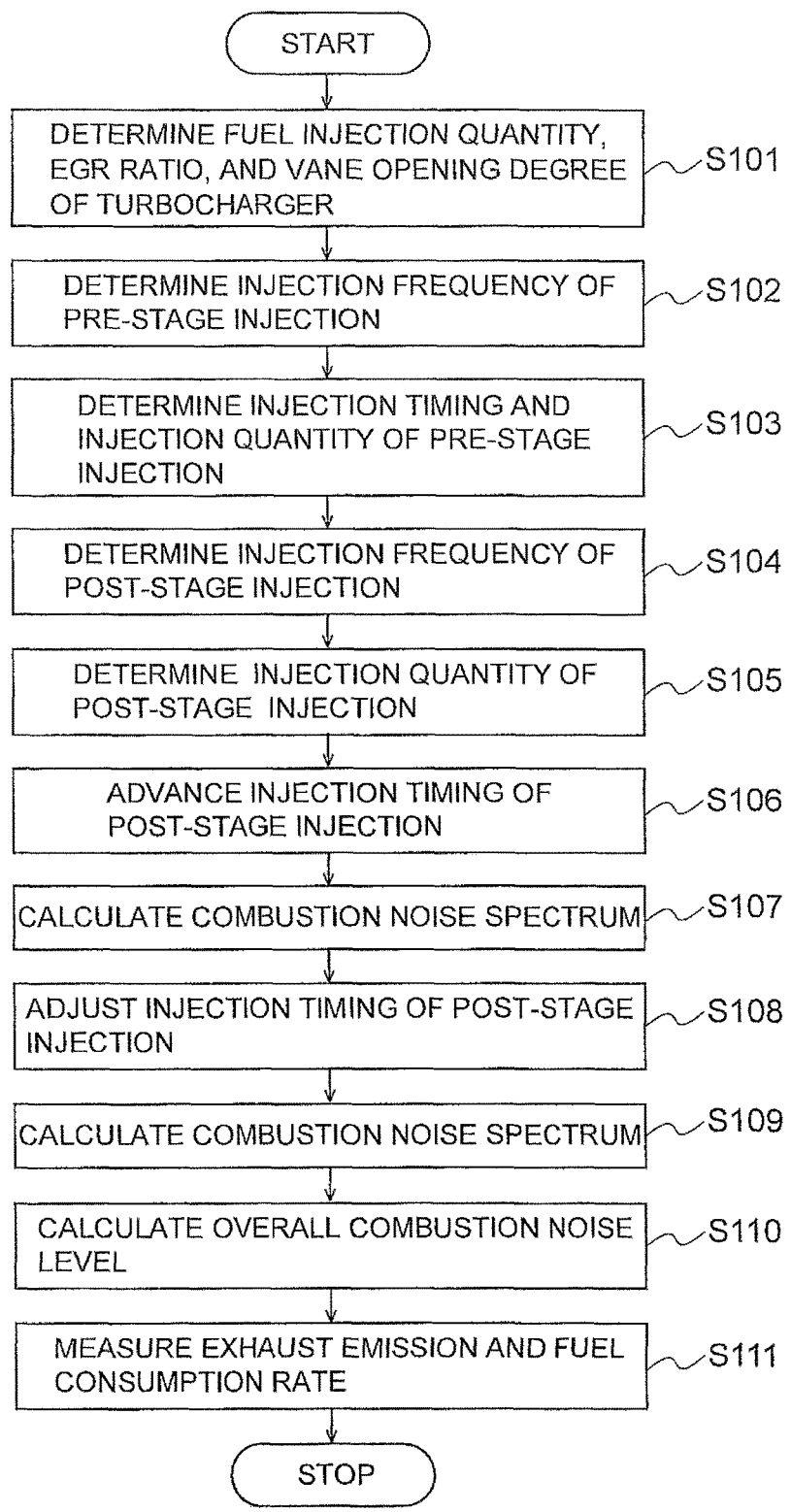
FIG. 11A is a flowchart explaining an example of a preparation method of a characteristic map indicating an interval relationship between pre-stage injection timing and post-stage injection timing with respect to an engine rotation speed and an engine load of the compression ignition type internal combustion engine.

To be exact, the interval Δt0 between the timing of the pre-stage injection and the timing of the post-stage injection satisfying the offset condition, in which the pressure waves are offset, is changed according to an operation state such as an engine rotation speed and the engine load of the compression ignition type internal combustion engine 10. Therefore, the electronic control device 50 may determine the interval Δt0 between the timing of the pre-stage injection and the timing of the post-stage injection so that the condition offsetting the pressure waves is approximately satisfied based on the engine rotation speed and the load of the compression ignition type internal combustion engine 10. At this time, a characteristic map is prepared in advance by an actual machine experiment and is stored in a storage unit of the electronic control device 50. The characteristic map indicates the relationship of the interval Δt0 with respect to the engine rotation speed and the engine load to satisfy the condition offsetting the pressure waves. The electronic control device 50 calculates the interval Δt0 corresponding to the engine rotation speed and the engine load of the compression ignition type internal combustion engine 10 using the characteristic map. Moreover, the electronic control device 50 determines the interval Δt0 which satisfies the offset condition, in which the pressure waves are offset, based on the engine rotation speed and engine the load of compression ignition type internal combustion engine 10. Hereinafter, an example of a preparation method of the characteristic map for satisfying the condition offsetting the pressure waves will be described with reference to a flowchart of FIG. 11A.

In Step S101, the injection quantity (corresponding to the engine load) of the entire fuel, an exhaust circulation rate, and a variable vane opening degree of a turbocharger are determined. In Step S102, the injection frequency of the pre-stage injection is determined. Moreover, in this example, the injection frequency of the pre-stage injection is set to two times. In Step S103, the injection start timing and the injection period (injection quantity) of the pre-stage injection are determined (two times for this example). In Step S104, the injection frequency of the post-stage injection is determined. Moreover, in this example, the injection frequency of the post-stage injection is set to one time. In Step S105, the injection period (injection quantity) of the post-stage injection is determined.

In Step S106, the injection start timing of the post-stage injection is advanced and adjusted. More specifically, the injection start timing of the post-stage injection is adjusted so that the peak value equal to or more than the set value from the value obtained by differentiating the cylinder pressure during one cycle by the crank angle (or the value obtained by differentiating the cylinder pressure by a time) is one. The value obtained by differentiating the cylinder pressure by the crank angle (or the value obtained by differentiating the cylinder pressure by a time) is acquired by differentiating the cylinder pressure history of the actual machine detected by the cylinder pressure sensor by the crank angle (differentiating the cylinder pressure history by a time). In addition, here, the set value is set to a value which is larger than the peak value by the low-temperature oxidation reaction and is smaller than the peak value by the high-temperature oxidation reaction. In Step S107, the cylinder pressure history of the actual machine is detected by the cylinder pressure sensor. Subsequently, the Fast Fourier Transform is performed on the cylinder pressure history, and the combustion noise spectrum is acquired. Moreover, the frequency f0 at which the combustion noise level becomes the maximum is acquired based on the combustion noise spectrum.

Figure 11B:
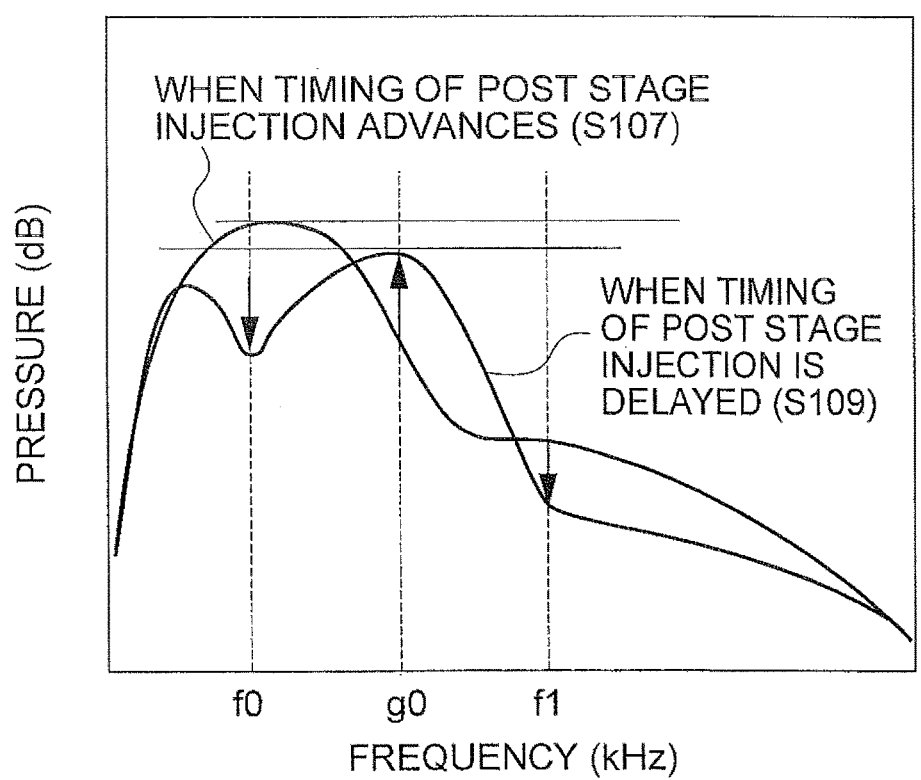
FIG. 11B is a view illustrating another example of the change of the combustion noise spectrum.
Figure 11C:
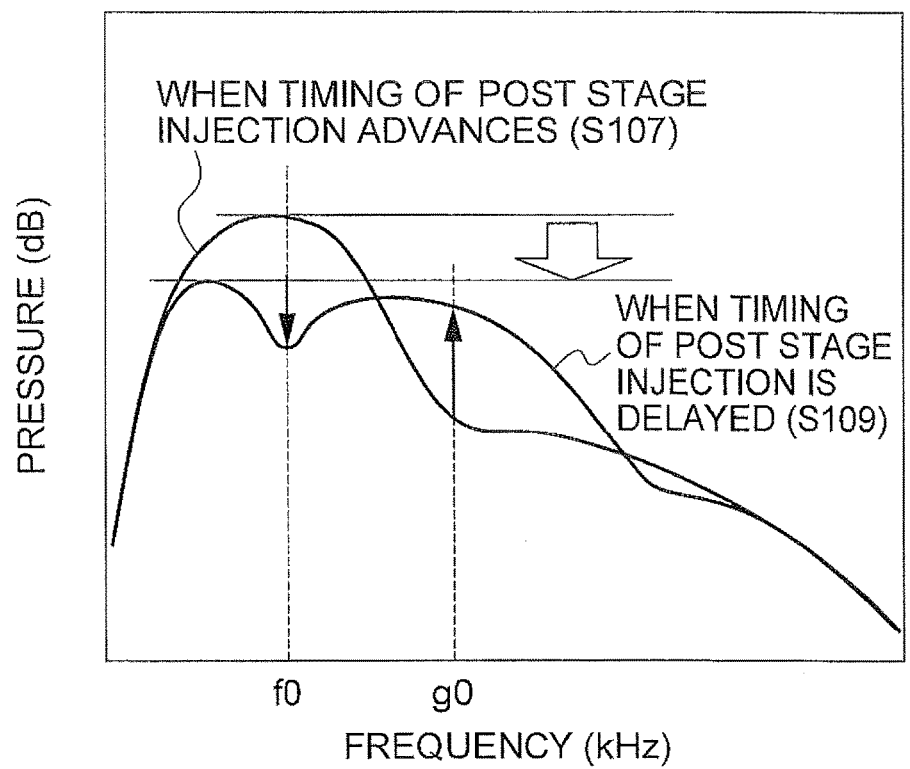
FIG. 11C is a view illustrating still another example of the change of the combustion noise spectrum.
Figure 12:
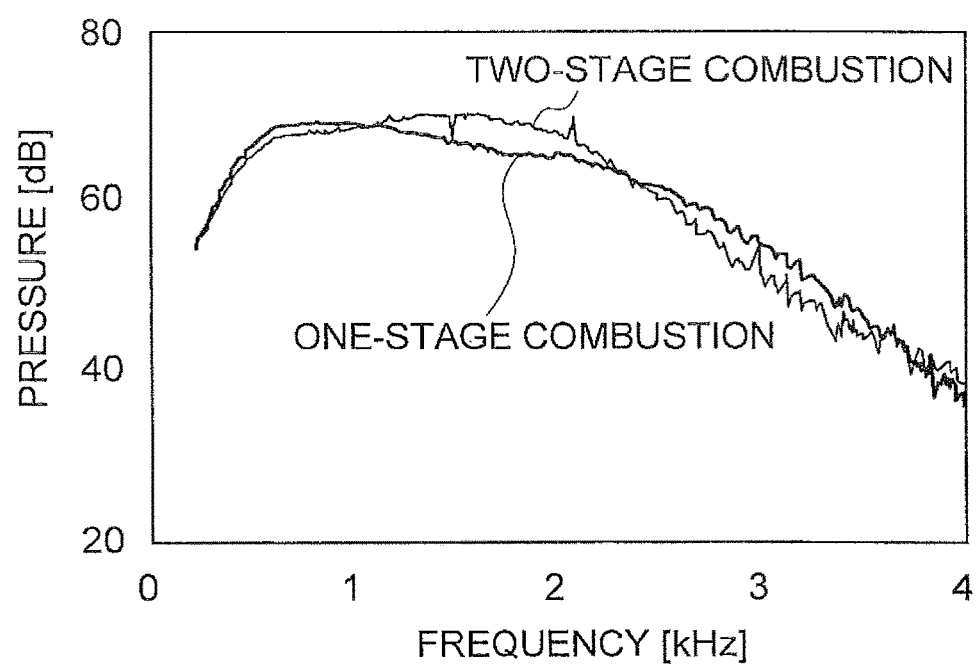
FIG. 12 is a view illustrating another example of the combustion noise spectrum in the actual machine experiment.
Figure 13:
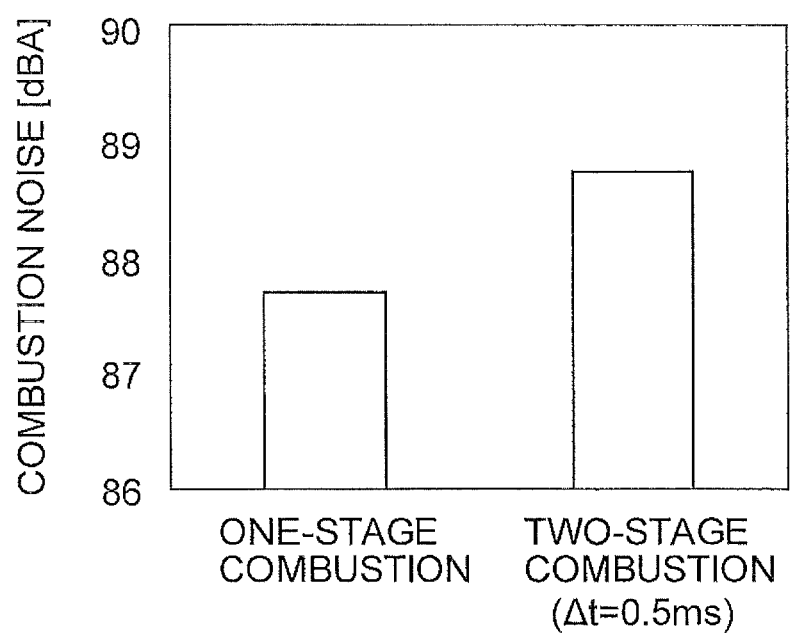
FIG. 13 is a view illustrating another example of the overall combustion noise level in the actual machine experiment.

In Step S108, the injection start timing of the post-stage injection is delayed and adjusted. More specifically, the injection start timing of the post-stage injection is delayed, and the injection start timing is adjusted so that the interval Δt1 between the timing of the pre-stage peak and the timing of the post-stage peak satisfies 0.5/f0 and two peaks of the pre-stage peak and the post-stage peak exist from the value obtained by differentiating the cylinder pressure during one cycle by the crank angle (or the value obtained by differentiating the cylinder pressure by a time). In Step S109, the strength of the combustion noise spectrum is confirmed. More specifically, the combustion noise spectrum is calculated again. Moreover, it is confirmed that the spectrum strength, in which the combustion noise component is amplified at the frequency g0 corresponding to the same period as the interval Δt1, does not become the maximum at the frequency g0. For example, as illustrated in FIG. 11B, when the spectrum strength becomes the maximum at the frequency g0, the injection start timing of the post-stage injection is slightly advanced or delayed, and the combustion noise spectrum is calculated again. For example, as illustrated in FIG. 11C, the peak of the spectrum, which is positioned at the low frequency side or the high frequency side of the valley (the frequency f0 at which the combustion noise spectrum becomes the maximum in Step S107) of the combustion noise spectrum, is set to be the same as the maximum value or the value at the frequency g0.

In Step SI10, the combustion noise level is confirmed. More specifically, it is confirmed that the overall combustion noise level is less than a target level. When the overall combustion noise level is not less than the target level, Step SI01 to Step SI09 are repeated again. When the overall combustion noise level is less than the target level, Step Sill is performed. In Step SI11, it is confirmed that a target value is satisfied. For example, the target value includes exhaust emission, a fuel consumption rate, or other variables. When the target value is not satisfied, Step S101 to Step SI10 are repeated again. By repeating Step SI01 to Step Sill while changing the engine rotation speed and the engine load of the compression ignition type internal combustion engine 10, it is possible to prepare the characteristic map for satisfying the offset condition offsetting the pressure waves.

In addition, the ignition delay period of each injection combustion may be changed by the change of a temperature or fuel properties (cetane number). In this case, the interval Δt1 between the timing of the pre-stage peak and the timing of the post-stage peak is changed. Accordingly, the electronic control device 50 acquires the interval Δt1 between the timing of the pre-stage peak and the timing of the post-stage peak by differentiating the cylinder pressure history of the compression ignition type internal combustion engine 10, which is detected by the cylinder pressure sensor, by the crank angle (or by differentiating the cylinder pressure history by a time). Moreover, the electronic control device 50 may control the interval Δt0 between the timing of the pre-stage injection and the timing of the post-stage injection so that the interval Δt0 approximately satisfies the condition (0.5/f0) offsetting the pressure waves. By controlling the interval Δt0 to satisfying the condition offsetting the pressure waves based on the value obtained by differentiating the cylinder pressure, which is detected by the cylinder pressure sensor, by the crank angle (or the value obtained by differentiating the cylinder pressure by a time), even when the ignition delay period of each injection combustion is changed by the change of the temperature or the fuel properties (cetane number), the pressure waves generated at the time of the fuel combustion by the pre-stage injection and the pressure waves generated at the time of the fuel combustion by the post-stage injection can be offset from each other in the vicinity of the frequency ID at which the combustion noise level becomes the maximum. Accordingly, it is possible to decrease the combustion noise component.

In the above, the embodiment of the present invention is described. However, the present invention is not limited to the embodiment. The present invention may be embodied in various aspects within a scope which does not depart from the gist of the present invention.

For example, the compression ignition type internal combustion engine wherein fuel is injected into a cylinder and combusted by self-ignition, wherein pre-stage injection and post-stage injection as fuel injection are performed during one cycle; injection timing and injection amount of the pre-stage injection and the post-stage injection are adjusted so that a value obtained by differentiating a cylinder pressure by a time or a value obtained by differentiating the cylinder pressure by a crank angle during one cycle has a pre-stage peak by combustion of the fuel supplied by the pre-stage injection and a post-stage peak by combustion of the fuel supplied by the post-stage injection; and the interval between the timing of the pre-stage injection and the timing of the post-stage injection is adjusted so that an interval Δt1 between the timing of the pre-stage peak and the timing of the post-stage peak approximately satisfies the condition that the interval Δt1 is 0.5 times an inverse number of a frequency at which a combustion noise level becomes the maximum when fuel injection is performed so that a single peak equal to or more than a set value is derived from the value obtained by differentiating the cylinder pressure by a time or the value obtained by differentiating the cylinder pressure by a crank angle during one cycle.

Moreover, for example, the compression ignition type internal combustion engine may adjust the interval between the pre-stage injection timing and the post-stage injection timing so that the condition is approximately satisfied based on the engine rotation speed and the engine load.

In addition, for example, the compression ignition type internal combustion engine may adjust the interval between the pre-stage injection timing and the post-stage injection timing so that the condition is approximately satisfied based on the value obtained by differentiating the cylinder pressure, which is detected by the cylinder pressure sensor, by a time or by the crank angle.

In addition, for example, the compression ignition type internal combustion engine may adjust the pre-stage injection timing so that the Premixed Charge Compression Ignition combustion is performed on the pre-stage injection fuel.

What is claimed is:

1. A fuel injection control apparatus of a compression ignition type internal combustion engine, wherein fuel is injected into a cylinder and combusted by self-ignition, the apparatus comprising:
   a controller configured to control an injector that injects the fuel into the cylinder so as to perform pre-stage injection and post-stage injection as fuel injection during one cycle,
   wherein the controller:
   adjusts timing of the pre-stage injection, an injection amount of the pre-stage injection, timing of the post-stage injection, and an injection amount of the post-stage injection so that a value obtained by differentiating a cylinder pressure by a time or a value obtained by differentiating the cylinder pressure by a crank angle during one cycle has a pre-stage peak by combustion of the fuel supplied by the pre-stage injection and a post-stage peak by combustion of the fuel supplied by the post-stage injection;
   adjusts an interval $\Delta t0$ between the timing of the pre-stage injection and the timing of the post-stage injection so that an interval $\Delta t1$ between the timing of the pre-stage peak and the timing of the post-stage peak approximately satisfies a condition such that $\Delta t1=0.5/f0$,
   wherein f0 is a frequency at which a combustion noise level becomes the maximum when fuel injection is performed so that a single peak equal to or more than a set value is derived from the value obtained by differentiating the cylinder pressure by a time or the value obtained by differentiating the cylinder pressure by a crank angle during one cycle; and
   adjusts the timing of the pre-stage injection and the timing of the post-stage injection so that the spectrum strength of the combustion noise component does not have a maximum value at the frequency g0, wherein g0 is a frequency corresponding to the same period as the interval $\Delta t1$.

2. The fuel injection control apparatus according to claim 1,
   wherein the controller controls the interval $\Delta t0$ between the timing of the pre-stage injection and the timing of the post-stage injection based on an engine rotation speed and an engine load so that the interval $\Delta t1$ between the timing of the pre-stage peak and the timing of the post-stage peak approximately satisfies the condition.

3. The fuel injection control apparatus according to claim 2,
   wherein the controller controls the interval $\Delta t0$ between the timing of the pre-stage injection and the timing of the post-stage injection based on a characteristic map indicating a relationship of the interval $\Delta t0$ between the timing of the pre-stage injection and the timing of the post-stage injection with respect to an engine rotation speed and an engine load.

4. The fuel injection control apparatus according to claim 1,
   wherein the controller controls the interval $\Delta t0$ between the timing of the pre-stage injection and the timing of the post-stage injection so that the interval $\Delta t1$ between the timing of the pre-stage peak and the timing of the post-stage peak approximately satisfies the condition, based on the value obtained by differentiating the cylinder pressure by a time or the value obtained by differentiating the cylinder pressure by a crank angle during one cycle, the cylinder pressure being detected by a cylinder pressure sensor.

5. The fuel injection control apparatus according to claim 4,
   wherein the controller controls the interval $\Delta t0$ between the timing of the pre-stage injection and the timing of the post-stage injection based on a table indicating the relationship of the interval $\Delta t0$ between the timing of the pre-stage injection and the timing of the post-stage injection with respect to the interval $\Delta t1$ between the timing of the pre-stage peak and the timing of the post-stage peak.

6. The fuel injection control apparatus according to claim 1,
   wherein the controller controls the timing of the pre-stage injection so that Premixed Charge Compression Ignition Combustion is performed on fuel supplied by the pre-stage injection.

7. The fuel injection control apparatus according to claim 1,
   wherein the controller adjusts the interval $\Delta t0$ between the timing of the pre-stage injection and the timing of the post-stage injection so that the interval $\Delta t1$ becomes $0.5(f0+0.1\times f0/1.1)$ or more and $0.5(f0-0.1\times f0/1.1)$ or less.

8. The fuel injection control apparatus according to claim 1, wherein the controller adjusts the timing of the post-stage injection and the injection amount of the post-stage injection so that a post-stage peak value in the value obtained by differentiating the cylinder pressure by a time or a post-stage peak value in the value obtained by differentiating the cylinder pressure by a crank angle becomes a positive value.

9. The fuel injection control apparatus according to claim 1,
   wherein the controller adjusts the timing of the post-stage injection and the injection amount of the post-stage injection so that a difference between a smaller value of the pre-stage peak value or the post-stage peak value and the minimum value of the valley is 50 kPa/deg. or more.

10. A compression ignition type internal combustion engine wherein fuel is injected into a cylinder and combusted by self-ignition, wherein
    pre-stage injection and post-stage injection as fuel injection are performed during one cycle;
    injection timing and injection amount of the pre-stage injection and the post-stage injection are adjusted so that a value obtained by differentiating a cylinder pressure by a time or a value obtained by differentiating the cylinder pressure by a crank angle during one cycle has a pre-stage peak by combustion of the fuel supplied by the pre-stage injection and a post-stage peak by combustion of the fuel supplied by the post-stage injection;

the interval between the timing of the pre-stage injection and the timing of the post-stage injection is adjusted so that an interval $\Delta t1$ between the timing of the pre-stage peak and the timing of the post-stage peak approximately satisfies the condition that the interval $\Delta t1$ is 0.5 times an inverse number of a frequency at which a combustion noise level becomes the maximum when fuel injection is performed so that a single peak equal to or more than a set value is derived from the value obtained by differentiating the cylinder pressure by a time or the value obtained by differentiating the cylinder pressure by a crank angle during one cycle; and the timing of the pre-stage injection and the timing of the post-stage injection are adjusted so that the spectrum strength of a combustion noise component does not have a maximum value at the frequency $g0$, wherein $g0$ is a frequency corresponding to the same period as the interval $\Delta t1$.

\* \* \* \* \*